United States Patent
Sahasi et al.

(10) Patent No.: US 8,682,969 B1
(45) Date of Patent: Mar. 25, 2014

(54) FRAMED EVENT SYSTEM AND METHOD

(75) Inventors: Jayesh Sahasi, Fremont, CA (US); Kamalaksha Ghosh, Sunnyvale, CA (US)

(73) Assignee: ON24, Inc., San Francisco, CA (US)

( * ) Notice: Subject to any disclaimer, the term of this patent is extended or adjusted under 35 U.S.C. 154(b) by 2556 days.

(21) Appl. No.: 11/246,033

(22) Filed: Oct. 7, 2005

(51) Int. Cl.
*G06F 15/16* (2006.01)
*G06F 15/173* (2006.01)

(52) U.S. Cl.
USPC .......... 709/204; 709/203; 709/217; 709/223; 709/227

(58) Field of Classification Search
USPC ............... 709/203–206, 217–219, 223–229; 726/27, 28; 715/730, 732, 750–759
See application file for complete search history.

(56) References Cited

U.S. PATENT DOCUMENTS

| | | | |
|---|---|---|---|
| 7,330,875 B1* | 2/2008 | Parasnis et al. | 709/204 |
| 2001/0027420 A1* | 10/2001 | Boublik et al. | 705/26 |
| 2001/0032242 A1* | 10/2001 | Terahama et al. | 709/204 |
| 2002/0016788 A1* | 2/2002 | Burridge | 709/204 |
| 2002/0112155 A1* | 8/2002 | Martherus et al. | 713/155 |
| 2002/0133719 A1* | 9/2002 | Westerdal | 713/201 |
| 2003/0037131 A1* | 2/2003 | Verma | 709/223 |
| 2003/0115267 A1* | 6/2003 | Hinton et al. | 709/204 |
| 2003/0204566 A1* | 10/2003 | Dhupelia et al. | 709/205 |
| 2004/0030787 A1* | 2/2004 | Jandel et al. | 709/229 |
| 2004/0059941 A1* | 3/2004 | Hardman et al. | 713/201 |
| 2004/0073629 A1* | 4/2004 | Bazot et al. | 709/217 |
| 2004/0162787 A1* | 8/2004 | Madison et al. | 705/64 |
| 2005/0204148 A1* | 9/2005 | Mayo et al. | 713/185 |
| 2006/0265495 A1* | 11/2006 | Butler et al. | 709/224 |
| 2007/0174905 A1* | 7/2007 | Martherus et al. | 726/8 |
| 2008/0005247 A9* | 1/2008 | Khoo | 709/206 |

* cited by examiner

*Primary Examiner* — Ian N Moore
*Assistant Examiner* — Jenee Alexander
(74) *Attorney, Agent, or Firm* — DLA Piper LLP (US)

(57) ABSTRACT

A framed event system and method are provided that may be used for online multimedia communications. The framed event system presents a multimedia application via the web without the use of any installed applications other than a web browser.

2 Claims, 16 Drawing Sheets

Table 130:

| DISPLAY_PROFILE_ID | EVENT_ID | SESSION_ID | DISPLAY_TYPE_CD |
|---|---|---|---|
| 41386 | 13521 | 1 | REGISTRATION |
| 41387 | 13521 | 1 | LOBBY |
| 41388 | 13521 | 1 | PLAYER |

Table 140:

| DISPLAY_PROFILE_ID | DISPLAY_ELEMENT_ID | DISPLAY_SEQUENCE |
|---|---|---|
| 41386 | 569140 | 0 |
| 41386 | 569141 | 1 |
| 41386 | 569142 | 2 |
| 41386 | 569143 | 3 |
| 41386 | 569144 | 4 |
| 41386 | 569145 | 5 |
| 41386 | 569146 | 6 |
| 41386 | 569147 | 7 |
| 41386 | 569148 | 8 |

Table 150:

| DISPL... | DISPLAY_ELEMENT_TYPE | DISPLAY_ELEMENT_VALUE | DISPLAY_ELE... | VALIDATIO... | IS_REQUIRED | IS_ACTIVE |
|---|---|---|---|---|---|---|
| 569140 | FREETEXT | Y | REG_INSTRUCTIONS | NONE | N | Y |
| 569141 | TEXTBOX | FIRST NAME | FIRSTNAME | NONE | Y | Y |
| 569142 | TEXTBOX | LAST NAME | LASTNAME | NONE | Y | Y |
| 569143 | TEXTBOX | COMPANY | COMPANY | NONE | Y | Y |
| 569144 | TEXTBOX | EMAIL | EMAIL | EMAIL | Y | Y |
| 569145 | FREETEXT | Y | REG_HELP_LINKS | NONE | N | Y |
| 569146 | FREETEXT | HTTPS://EVENT.ON24.COM/EVENTRE | REG_BUTTON | NONE | N | Y |
| 569147 | FREETEXT | <STYLE>!!BODY{TD !!!MARGIN-TOP: | REG_STYLE | NONE | N | Y |
| 569148 | IMAGE | Y | REG_BG_IMG | NONE | N | Y |

| SETUP REGISTRATION PAGE (EVENT 13521) - MICROSOFT INTERNET EXPLORER | | | | | | |
|---|---|---|---|---|---|---|
| ON24 | EVENT MANAGER | | | | | |
| ADD | SETUP REGISTRATION PAGE - EVENT 13521 | | | | | |
| | ADD ITEMS USING THE MENU BAR ON THE LEFT. CLICK ON ANY ROW AND DRAG/DROP TO RE-ORDER | | | | | |
| | TITLE OF FIELD | MOVE FIELD | FIELD TYPE | REQUIRED | HIDDEN | VALIDATION | EDIT | DELETE |
| STANDARD FIELDS | REGISTRATION INSTRUCTIONS | ⇦ MOVE ⇨ | STANDARD | | | NONE | EDIT | ☐ |
| TEXT FIELD | [FIRST NAME] | ⇦ MOVE ⇨ | TEXT (SINGLE LINE) | | ☐ | NONE | EDIT | ☐ |
| RADIO BUTTONS | [LAST NAME] | ⇦ MOVE ⇨ | TEXT (SINGLE LINE) | | ☐ | NONE | EDIT | ☐ |
| CHECKBOX | [COMPANY] | ⇦ MOVE ⇨ | TEXT (SINGLE LINE) | | | NONE | EDIT | ☐ |
| MULTICHECK | JAVASCRIPT AND COOKIES HELP LINK [EMAIL] | ⇦ MOVE ⇨ | STANDARD TEXT(SINGLE LINE) | | | NONE EMAIL | EDIT | ☐ |
| DROPMENU | JAVASCRIPT AND COOKIES HELP LINK | ⇦ MOVE ⇨ | STANDARD | | | NONE | | ☐ |
| TEXT/HTML | REGISTER BUTTON | | UPLOAD | | | NONE | EDIT | ☐ |
| STANDARD ELEMENTS | REGISTRATION STYLE | | STANDARD | | | NONE | EDIT | ☐ |
| | BACKGROUND IMAGE | | UPLOAD | | | | | |
| | PREVIEW | CLOSE | | | | | |

FRAMED EVENT SYSTEM AND METHOD

FIELD OF THE INVENTION

The invention is related to online multimedia presentations and communications and in particular to a computer implemented software system for online multimedia presentations.

BACKGROUND OF THE INVENTION

Conventional systems and methods exist that permit a multimedia presentation to be displayed over a computer network, such as the World Wide Web, to a plurality of audience members. The presentations presented to the audience members may be either a live presentation and/or an on-demand presentation. The presentations may include both web-casting and web-conferencing. Web-casting is an online presentation that includes an audio or video component that is delivered over the internet. Web-conferencing is an online presentation that may include a telephone based audio/video component, but does not include a standard internet based audio or video stream such as delivered by Quicktime®, Real®, or Windows Media Servers®.

One of the primary problems associated with Live (and often also On-demand) presentations on the Internet is the requirement for a download and install process for software that coordinates the various elements of the presentation. Whether it is the more ubiquitous Flash software, or a piece of proprietary software from a vendor like WebEx, installing software on an audience member's computer creates several challenges. First, there is no way to determine with certainty how the downloaded software will behave given the unique hardware, software, and data configuration of any particular audience member computer. This uncertainty makes troubleshooting, maintenance, and upgrades of the software difficult for system administrators. Second, security concerns often accompany the installation of new software, making it difficult to enforce a systematic security policy if a presentation requires a local installation in order for an audience member to view a presentation.

A second problem faced by almost all applications that are to be downloaded onto the audience member's computer is that they cannot be embedded without a clients' web site due to their complex functionality and the limitations imposed by online browsers' security models. In particular, a typical browser will not typically permit a web page served from one domain to read cookies written by a web page from another domain.

The current products that provide live presentations over the Internet including products offered by Macromedia, Webex, Placeware, Accordent and Communicast. However, all of these prior solutions have not so far addressed the need for a rich media viewer that incorporates the rich functionality described previously with a browser-based, no-download application. All of these conventional solutions have so far addressed markets where the end-users are willing to go to the trouble of installing and maintaining the vendor software on the local machines. Thus, none of the existing solutions provide a fully embedded, fully web-based, no-download solution to live online web conferences, webcasts, and presentations in general. Thus, it is desirable to provide a system and method that overcomes these limitations of the existing solutions and it is to this end that the present invention is directed.

SUMMARY OF THE INVENTION

A framed event system and method are provided. The framed event system provides a fully embedded, fully web-based, no-download solution to online web conferences, webcasts, and online presentations in general. In a preferred embodiment of the invention, the system may use only the tools available on a standard operating system installation (e.g., Windows®, Internet Explorer®, Windows media Player®) to achieve the framed event system. The presentations that can be viewed by an attendee using the inventive system may include, but are not limited to the following: 1) slides (like Powerpoint® graphics); 2) uniform resource locators (URL's) pushed by a presenter to the Audience members; 3) polls and surveys; 4) comments and questions answered by the Presenter via text or audio/video; 5) a view of the shared desktop, or of a particular application on the Presenter's computer; and 6) a list of slide titles that appear as "Agenda" or "Chapter" elements, and are synchronized with the audio/video as well as graphics and other interactive elements on the screen.

The application of the framed event system is able to overcome the requirement for a download and install process for software that coordinates the various elements of the presentation. Thus, the framed event system application can be fully embedded within any parent web site with the inclusion of minimal (a few lines) of HTML and javascript code.

The framed event system is fully web-based, and does not require downloads of proprietary software for Rich Media Presentations. In accordance with the invention, the framed event system can be completely embedded within a client web site and does not require a visible transfer of control to another web site. The framed event system does not require that any web site seeking to provide this functionality to its audience have all the software and infrastructure to present the application installed—it can be provided as an externally hosted service without any loss of functionality using a sub-domain or CNAME hosted by ON24 (e.g., richmedia.CLIENTNAME.COM.) The framed event system works for Live as well as On-Demand versions of the Rich media presentations, and the conversion from Live to On-Demand version is seamless, and can take as little as a second to accomplish.

The framed event system in accordance with the invention, since no download is required and the application is entirely browser-based, a significant increase in efficiency is expected in terms of the maintainability of the application since the problem with each audience member's computer configurations is no longer a problem. In addition, since the problem of hosting the application in one domain while embedding in within a web page on another domain has been solved, a significant benefit regarding usability and branding has been achieved. In addition, allowing various elements (e.g., URL's, Polls, Surveys, Slides, Q&A, etc.) to be embedded within the same page has eliminated the problem of popup-blockers, there is a consistent and higher quality user experience for all viewers

BRIEF DESCRIPTION OF THE DRAWINGS

FIG. 8 illustrates an example of the data structures used to generate the user interface of the framed event system;

FIG. 10 illustrates an example of a user interface for setting up the registration page of a framed event;

DETAILED DESCRIPTION OF A PREFERRED EMBODIMENT

The invention is particularly applicable to a computer-implemented framed event system for a event presentation and it is in this context that the invention will be described. It will be appreciated, however, that the system and method in accordance with the invention has greater utility, such as to a variety of different presentations. In accordance with the invention, the framed event system may be used to display any digital data presentation and is not limited to any particular presentation. The presentations that can be viewed by an attendee using the inventive system may include, but are not limited to the following: 1) slides (like Powerpoint graphics); 2) uniform resource locators (URL's) pushed by a Presenter to the Audience members; 3) polls and surveys; 4) comments and questions answered by the Presenter via text or audio/video; 4) a view of the shared desktop, or of a particular application on the Presenter's computer; and 5) a list of slide titles that appear as "Agenda" or "Chapter" elements, and are synchronized with the audio/video as well as graphics and other interactive elements on the screen.

Figure 1:
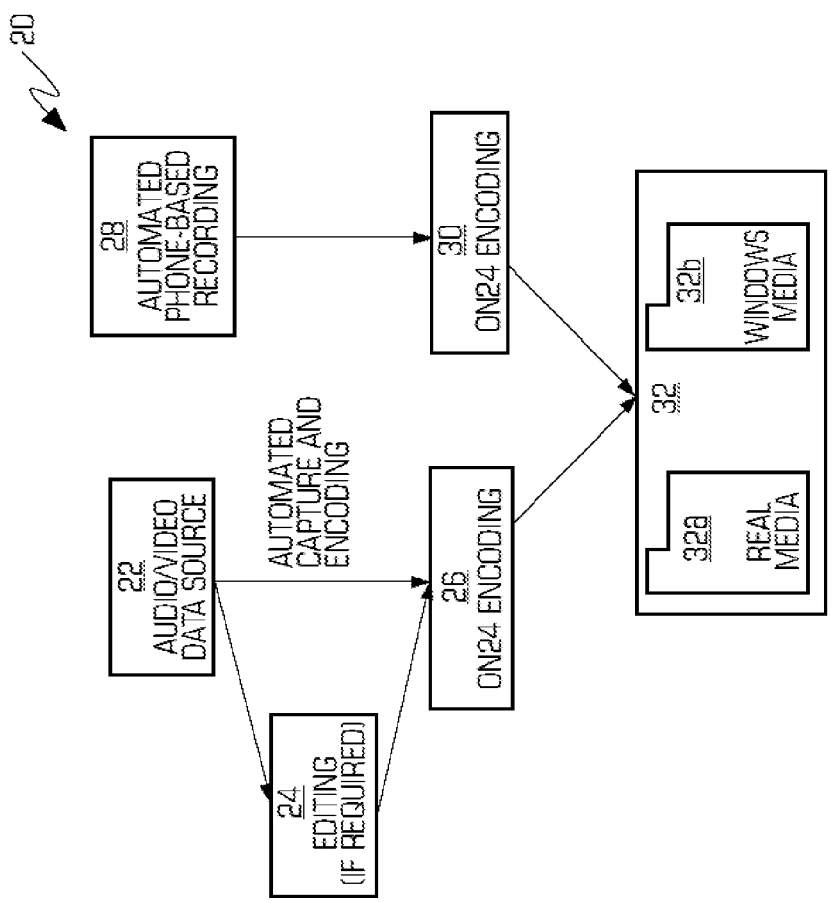
FIG. 1 is a diagram illustrating a method for asset acquisition for a framed event system.

FIG. 1 is a diagram illustrating a method 20 for asset acquisition for a framed event system. As shown, an audio/video or audio data source 22 is edited in step 24 if necessary or is automatically captured. In step 26, the data source 22 is encoded. Alternatively, an automated phone-based recording source 28 is encoded in step 30. The encoded data may then be stored in a media database 32, such as in a real media format 32a and/or a windows media format 32b. In this manner, a data source/piece of media is prepared for distribution using a framed event system, an example of which is shown in FIG. 2.

Figure 2:
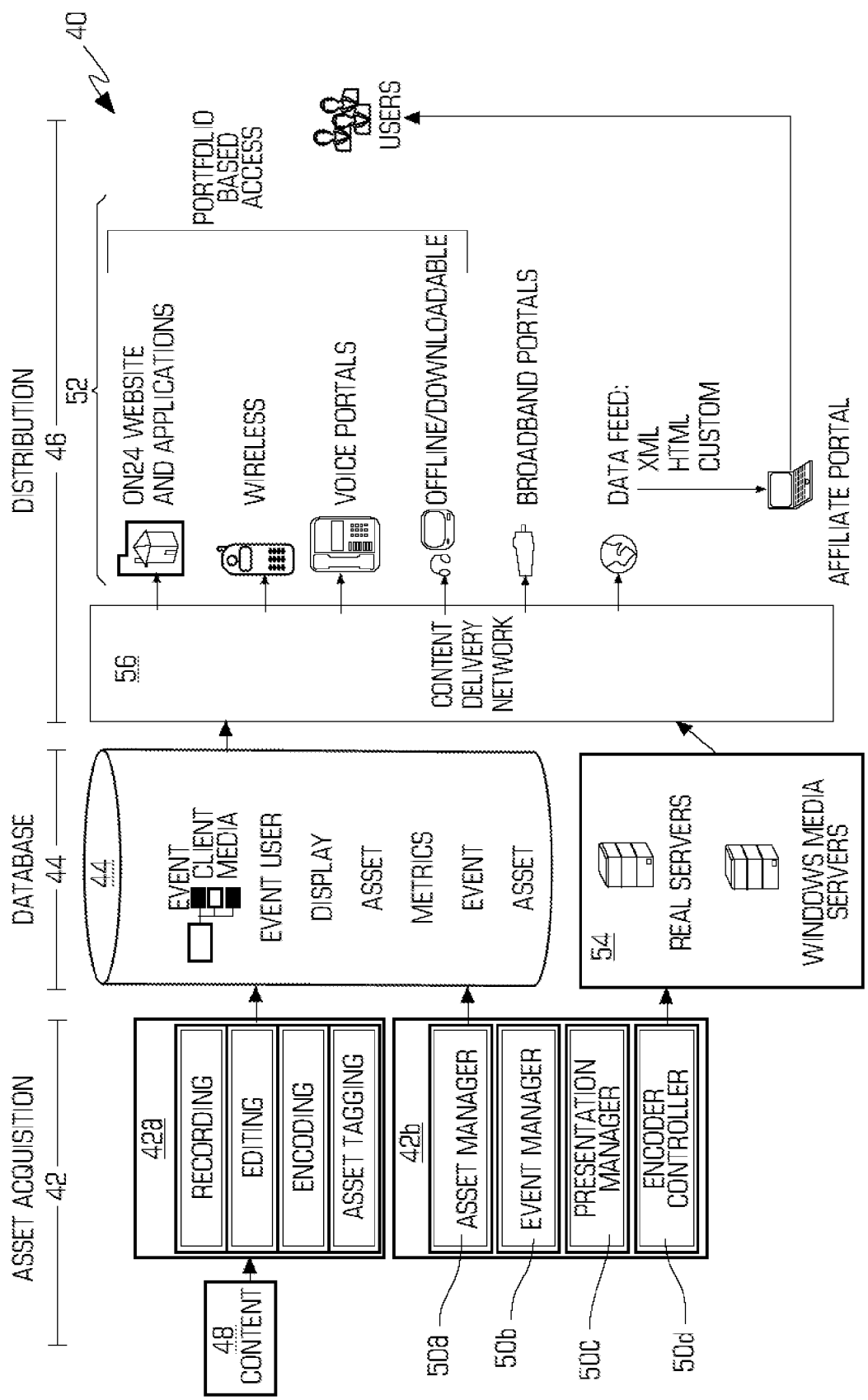
FIG. 2 is a diagram illustrating an example of an embodiment of a framed event system.

FIG. 2 is a diagram illustrating a framed event system 40 into which the synchronization apparatus may be incorporated. The framed event system 40 may comprise an asset acquisition and event management portion 42, a database portion 44 and a distribution portion 46 wherein a piece of media/content 48 is input into the framed event system 40 in order to distribute that content/piece of media during the framed event. Generally, each element of the framed event system being described is implemented in software wherein each portion may be one or more software modules and each software modules may be a plurality of computer instructions being executed to perform a particular function/operation of the system. Each element of the system may thus be implemented as one or more computer resources, such as typical personal computers, servers or workstations that have one or more processors, persistent storage devices and memory with sufficient computing power in order to store and execute the software modules that form the frame event system in accordance with the invention. The framed event system may generate an event that is provided to one or more event clients 52 wherein each client is a computing resource, such as a personal computer, workstation, cellular phone, personal digital assistant, wireless email device, telephone, etc. with sufficient computing power to execute the event client located on the client wherein the client communicates with the framed event system over a wired or wireless connection.

In more detail, the asset acquisition and event management portion 42 may further comprise an asset acquisition portion 42a and an event management portion 42b wherein the asset acquisition portion performs one or more of the following functions: recording of the piece of media/content, editing of the piece of media/content, encoding of the piece of media/content and asset tagging. The event manager module 42b further comprises an asset manager module 50a, an event manager module 50b, a presentation manager module 50c and an encoder controller 50d. The asset manager module 50a, prior to a frame event, imports/exports content/pieces of media into/from a library of media as needed and manages the assets for each framed event presentation. The event manager module 50b may perform actions/function prior to and after an event. Prior to a particular event, the event manager module may reserve the event in the system (both resources and access points), set-up an event console which a user interacts with to manage the event and then send messages to each recipient of the upcoming event with the details of how to access/operate the event. After a particular event, the event manager module 50b may permit a user to import an old event presentation into the system in order to re-use one or more pieces of the old event presentation. The presentation manager module 50c, during a particular event presentation, generates an event file with the slides of the event presentation, URLs and polls to an encoder controller to distribute the particular event presentation to the users. The encoder controller 50d encodes the event presentation stream to one or more distribution server 54 that distributes the event presentation to the users.

As shown in FIG. 2, the database 44 may include data about each event, including the clients to which the event is being provided and the media associated with the event, one or more event users, the display of the particular event, the assets associated with the event, the metrics for the event and other event data. In combination with this data in the database for a particular event, operations and commands from the event manager module 42b are downloaded to the distribution servers 54 that distribute each event to each client 52 for the particular event over a distribution network 56. As shown, the event/presentation may be distributed to one or more different clients 52 that use one or more different methods to access the event. The clients 52 may include a client that downloads the presentation and then views the presentation offline.

Figure 3:
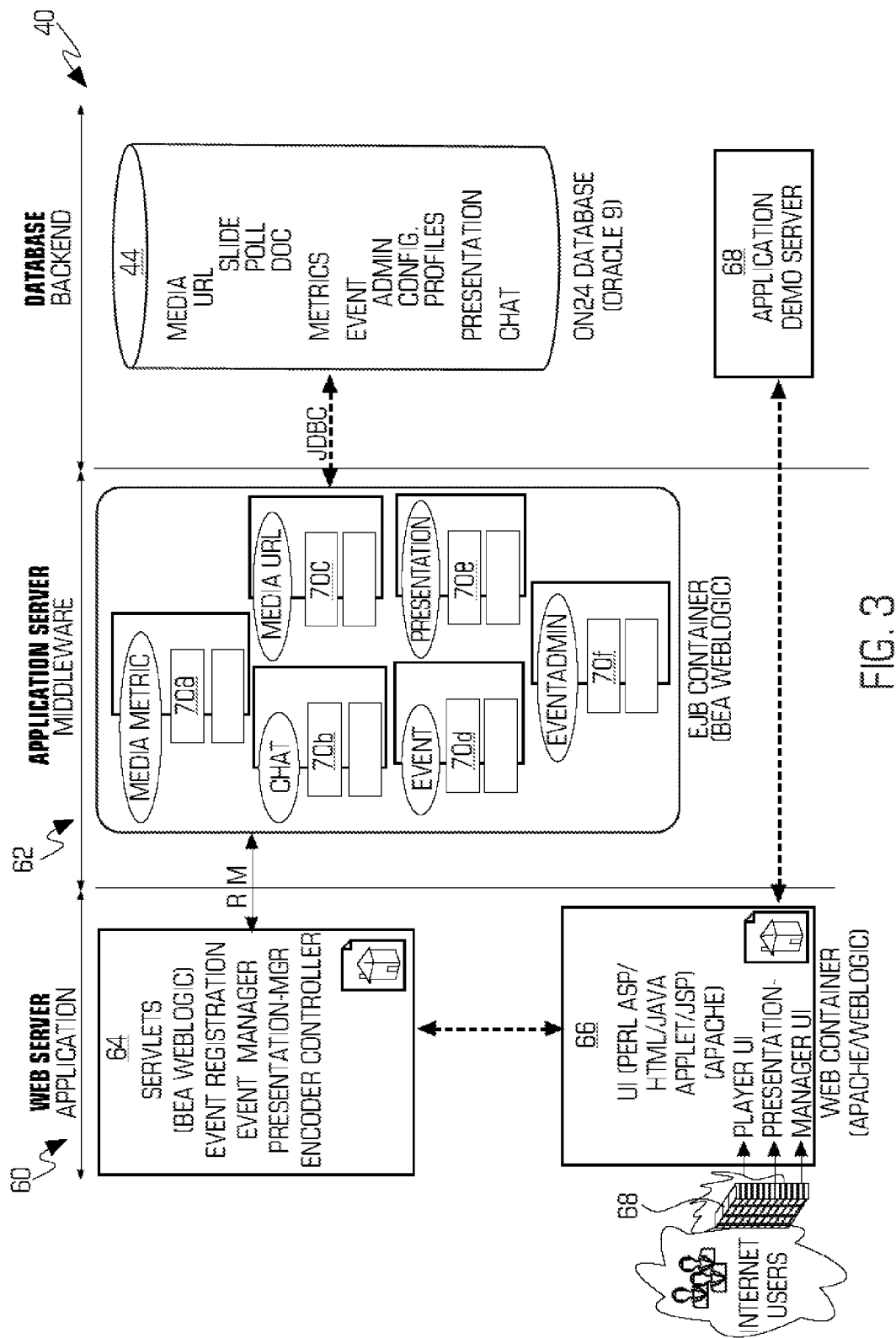
FIG. 3 illustrates a system architecture of the framed event system shown in FIG. 2.

FIG. 3 illustrates more details of the framed event system shown in FIG. 2. The framed event system may include a web server portion 60, an application server portion 62 and the database portion 40 (with the database 44) shown in FIG. 2. Each of these portions may be implemented as one or more computer resources with sufficient computing resources to implement the functions described below. In a preferred embodiment, each portion may be implemented as one or more well-known server computers. The web server portion 60 may further comprise one or more servlets 64 and a web container portion 66 which are both behind a typical firewall 68. In a preferred embodiment of the invention, the servlets reside on a BEA Weblogic system which is commercially available and may include an event registration servlet, an event manager module servlet, a presentation manager module servlet and an encoder controller servlet that correspond to the event manager module 50b, presentation manager module 50c and encoder controller 50c shown in FIG. 2. Each of these servlets implement the functions and operations described above for the respective portions of the system wherein each servlet is a plurality of lines of computer code executed on a computing resource with sufficient computing power and memory to execute the operations. The servlets may communicate with the application server portion 62 using well-known protocols such as, in a preferred embodiment, the well-known remote method invocation (RMI) protocol. The servlets may also communicate with the web container portion 66 which is preferable implemented using an well-known Apache/Weblogic system. The web container portion 66 generates a user interface, preferably using Perl Active Server Page (ASP), HTML, XML/XSL, Java Applet, Javascript and Java Server Pages (JSPs.) The web container portion 66 may thus generate a user interface for each client and the presentation manager module user interface. The user interface generated by the web container portion 66 may be output to the clients of the system through the firewall as well as to an application demo server 68 that permits a demo of any presentation to be provided.

The application server portion 62 may preferably be implemented using an Enterprise JavaBeans (EJBs) container implemented using a BEA Weblogic product that is commercially sold. The application server management portion 62 may be known as middleware and may include a media metric manager 70a, a chat manager 70b, a media URL manager 70c, an event manager 70d, a presentation manager 70e and an event administration manager 70f which may each be software applications performed the specified management operations. The application server portion 62 communicates with the database 44 using a protocol, such as the well-known Java Database Connectivity (JDBC) protocol in a preferred embodiment of the invention. The database 44 may preferably be implemented using an Oracle 8/9 database product that is commercially available. As shown, the database 44 may include media data including URL data, slide data, poll data and document data. The database 44 may further include metric data, event data and chat data wherein the event data may further preferably include administration data, configuration data and profile data.

Figure 4:
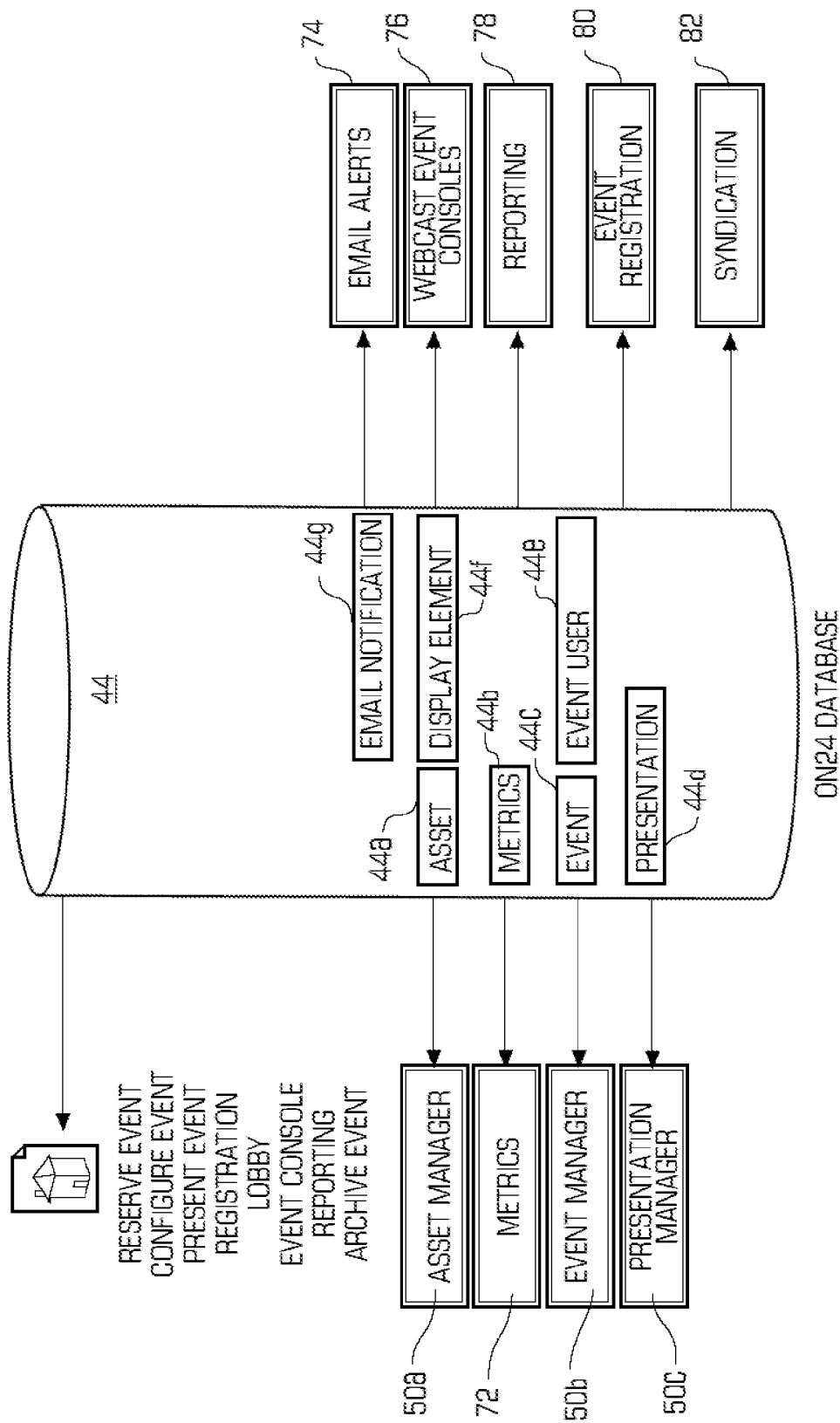
FIG. 4 is a functional diagram of the interacting components of the framed event database in FIG. 3.

FIG. 4 is a diagram illustrating more details of the framed event database 44 in FIG. 3. As shown in FIG. 4, the database may generate data that is used to implement a function to reserve an event, to configure an event, a present an event, for registration, for the lobby. for the event console, for reporting and for archiving an event. The database may include asset data 44a that may be provided to the asset manager module 50a, metrics data 44b that is provided to a metric module 72, event data 44c that is provided to the event manager module 50b, presentation data 44d that is provided to the presentation manager module 50c, event user data 44e that is provided to an event registration module 80, display element data 44f that is provided to an event consoles module 76 and email notification data 44g that is provided to an email alerts module 74. The database may also store data that is used by a reporting module 78 to generate reports about the events and presentations provided by the system. The database may also store data that is used by a syndication module 82 to syndicate and replicate existing presentations.

Figure 5:
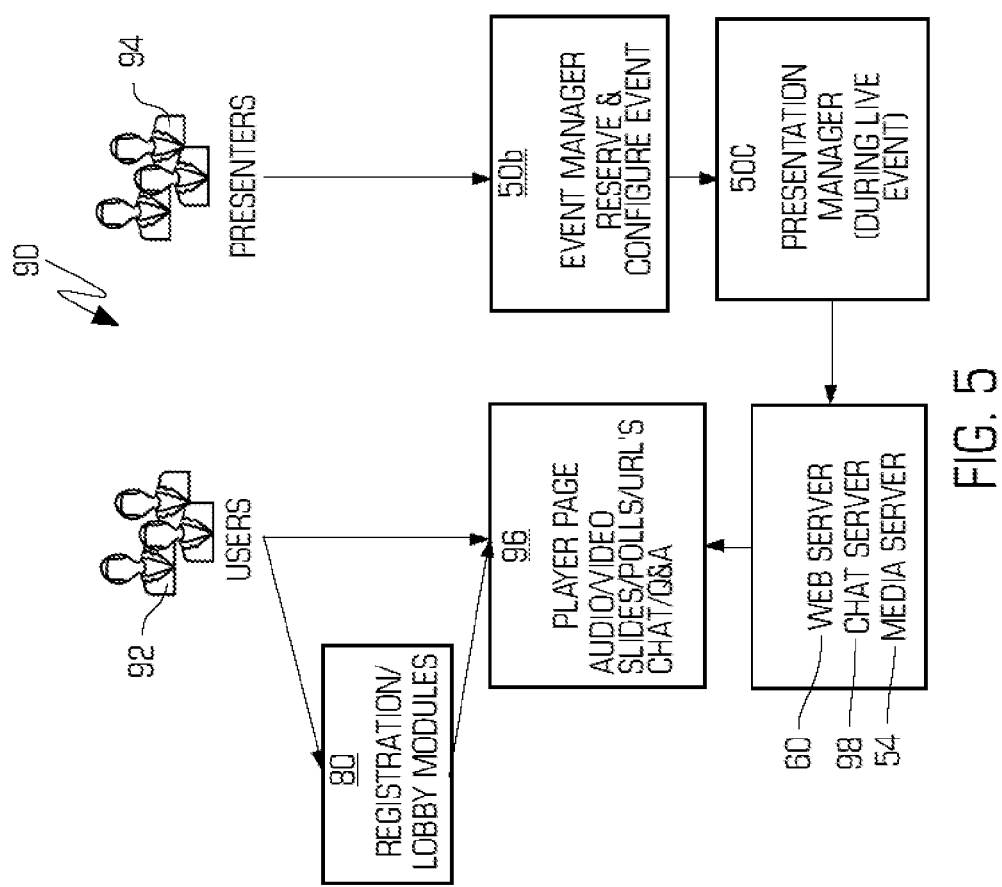
FIG. 5 is a diagram illustrating a presentation workflow.

FIG. 5 is a diagram illustrating a framed event center 90 that may be utilized by one or more users 92 that are presented with a presentation by the system and one or more presenters 94 who utilize the system to present presentations to the users 92. The users 92 may interact with a registration and lobby modules 80 that permit the users to register with the system and schedule a presentation to view. In response to a successful registration, the user may be presented with a player page 96, such as a web page provided to a client computer of the user, that provides the audio and visual data for the presentation, slides, polls and URLs for the presentation, chat sessions and question and answers for a particular presentation. The data in the player page 96 is provided by the web server 60, the media server 54 and a chat server 98 that provides the chat functionality for a presentation. The presentation data for a live event presentation is provided to the servers 54, 60 and 98 by the presentation manager module 50c. The presenters 94 may utilize the event manager module 50b to reserve an event and/or configure an event. Once the event is reserve and configured, the presentation data is forwarded to the presentation manager module 50c.

Figure 6:
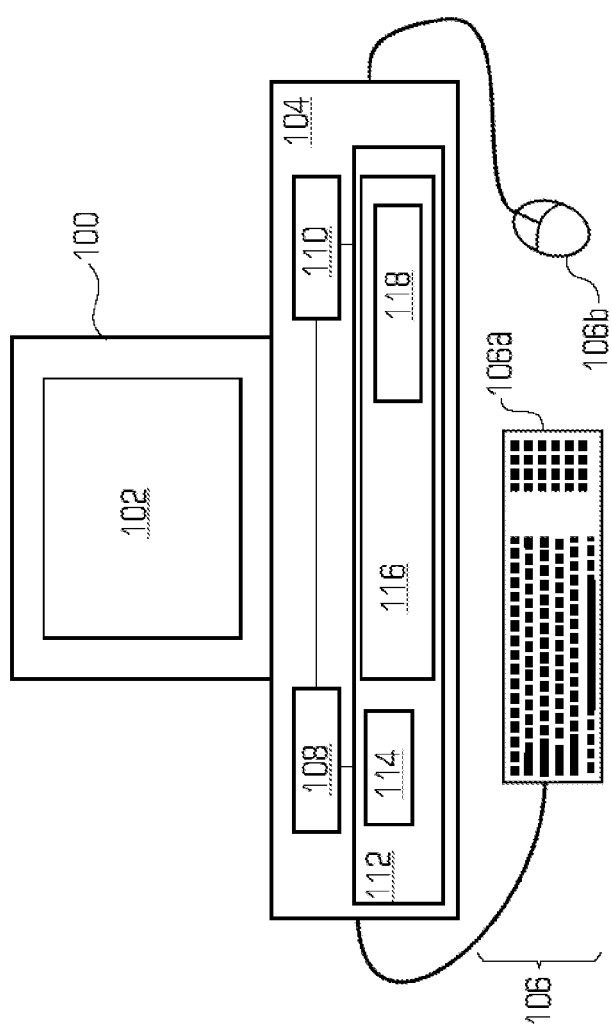
FIG. 6 is a diagram illustrating an example of a framed event client in accordance with the invention that may incorporate the asset management system.

FIG. 6 is a diagram illustrating an example of a framed event client 100 in accordance with the invention that may incorporate the synchronization apparatus. The event client 100 may be implemented as a personal computer, workstation, PDA, cellular phone and the like with sufficient computing power to implement the functions of the client as described below. In the example shown in FIG. 6, the event client may be a typical personal computer that may further comprise a display unit 102, such as a CRT or liquid crystal display or the like, a chassis 104 and one or more input/output devices 106 that permit a user to interact with the client 100, such as, for example, a keyboard 106a and a mouse 106b. The chassis 104 may further include one or more processors 108, a persistent storage device 110, such as a hard disk drive, optical disk drive. tape drive, etc., and a memory 112, such as SRAM, DRAM or flash memory. In a preferred embodiment, the client is implemented as one or more pieces of software stored in the persistent storage device 110 and then loaded into the memory 112 to be executed by the processor(s) 108. The memory may further include an operating system 114, such as Windows, and a typical browser application 116, such as Microsoft Internet Explorer or Netscape Navigator and an event module 118 (including a slide, polls, survey, URL, Q&A and a transcript synchronization module) that operates within the browser application. In accordance with the invention, the client side of the system/apparatus is implemented as Java code that is downloaded/streamed to the client 100 during/prior to each presentation so that the synchronization of the assets does not require a separate client software downloaded to the client.

Figure 7:
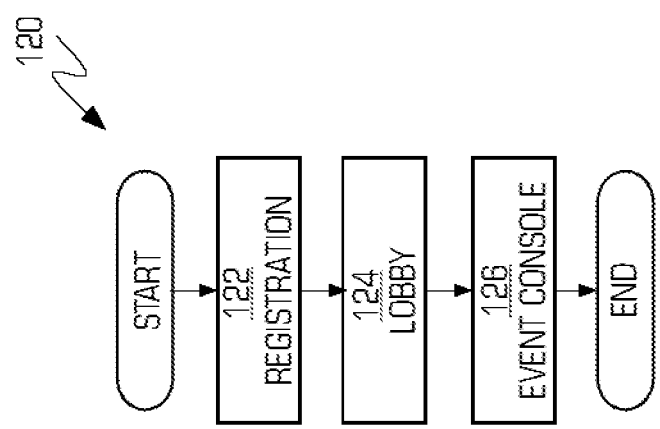
FIG. 7 illustrates a method for receiving an online presentation in accordance with the invention.

FIG. 7 illustrates a method 120 for receiving an online presentation in accordance with the invention. In step 122, a registration process may occur that is optional for a particular event. The registration may include a number of questions defined by the person configuring the event to be answered by an potential audience member and any required and optional fields to be filled in by an audience member. The registration may also permit a person that is presenting the particular event (known as the Presenter) to restrict access to the event using an email domain or the web page from which the Presenter launched the event. The method may also include a lobby step 124 in which the audience member is moved into a waiting area to wait for the live or archived event to become available. When the event becomes available, an event console step 126 in which an event console screen is displayed to the user that will display the actual presentation. The event console may include one or more event elements. The event elements in accordance with the invention may include one or more of 1) an "ask a question" area in which an audience member attending the event can verbally, or via text, ask the Presenter a question; 2) an area for viewing the presenter's picture or video; 3) Areas for viewing slides, web pages, polls, surveys, shared desktop applications, or other content the Presenter wishes to share with the audience members; and 4) the ability to download a certificate for any purpose (e.g., continuing education). Such a certificate can be used to certify that the viewer watched the presentation. Various configurations of the system may provide the certificate under different criteria, including but not limited to the following: 1) after watching the presentation for at least X number of minutes; 2) after successfully answering Y number of questions about the event/presentation; and 3) after filling out an opinion survey.

While the steps in FIG. 7 are described as distinct steps and often correspond to different screens as in the attached images, one or more of these steps can be visually integrated into fewer steps, or even removed from the process entirely, and still maintain the integrity of the overall invention. For example, the framed event system may use no registration or Lobby page at all and users come straight into the Event Console, which may or may not incorporate the functionality of the previous two steps as needed. While several conventional applications provide pieces of this functionality for the end-user, none of them provide it for both Live and On-Demand audiences, and without requiring the installation of vendor software. In addition, the framed event application is fully embeddable in any client web site without loss of any significant functionality. In other words, the application does not require a visible transition to a different web site, and can maintain the host web site's look-and-feel, URL, and control.

FIG. 8 illustrates example of the data structures used to generate the user interface of the framed event system. The framed event system has the database 44 that stores the data about the registration page, lobby page, and an event console page that are configured to display an arbitrary number of graphical, text, and HTML elements. A first data structure 130 contains a display_profile_ID field 132, an Event_ID field 134, a session_ID field 136 and a display_type_CD field 138 so that the data structure links an "event" or presentation to its display types (registration, lobby, and player (Event Console.) The display_profile_ID field contains an identifier that identifies a display element for a framed event, such as 41386, 41387 and 41388 for example, the Event_ID field contains an identifier of the framed event, such as 13521 for example, the session_ID field contains an identifier of the session associated with framed event, and the display_type_CD field contains the type of display element, such as the registration element, the lobby element and the player element.

A display profile data structure 140 lists the individual elements for each display type (registration, lobby, and player). In FIG. 8, the exemplary data structure lists the display elements for the registration page. The display profile structure has a display_profile_ID field 142, a display_element_ID field 144 and a display sequence field 146 wherein the display_profile_ID field contains the identifier of the display element (the registration page whose ID is 41386 is this example), the display_element_ID field contains the identifier for each display element and the display sequence field contains the sequence in which the display elements are displayed. A display element data structure 150 contains data about the collection of individual elements (images, text, html, javascript) that are configured for use in this display type (registration, lobby, player). Using these data structures, the framed event system is able to display the elements of the framed event.

Figure 9:
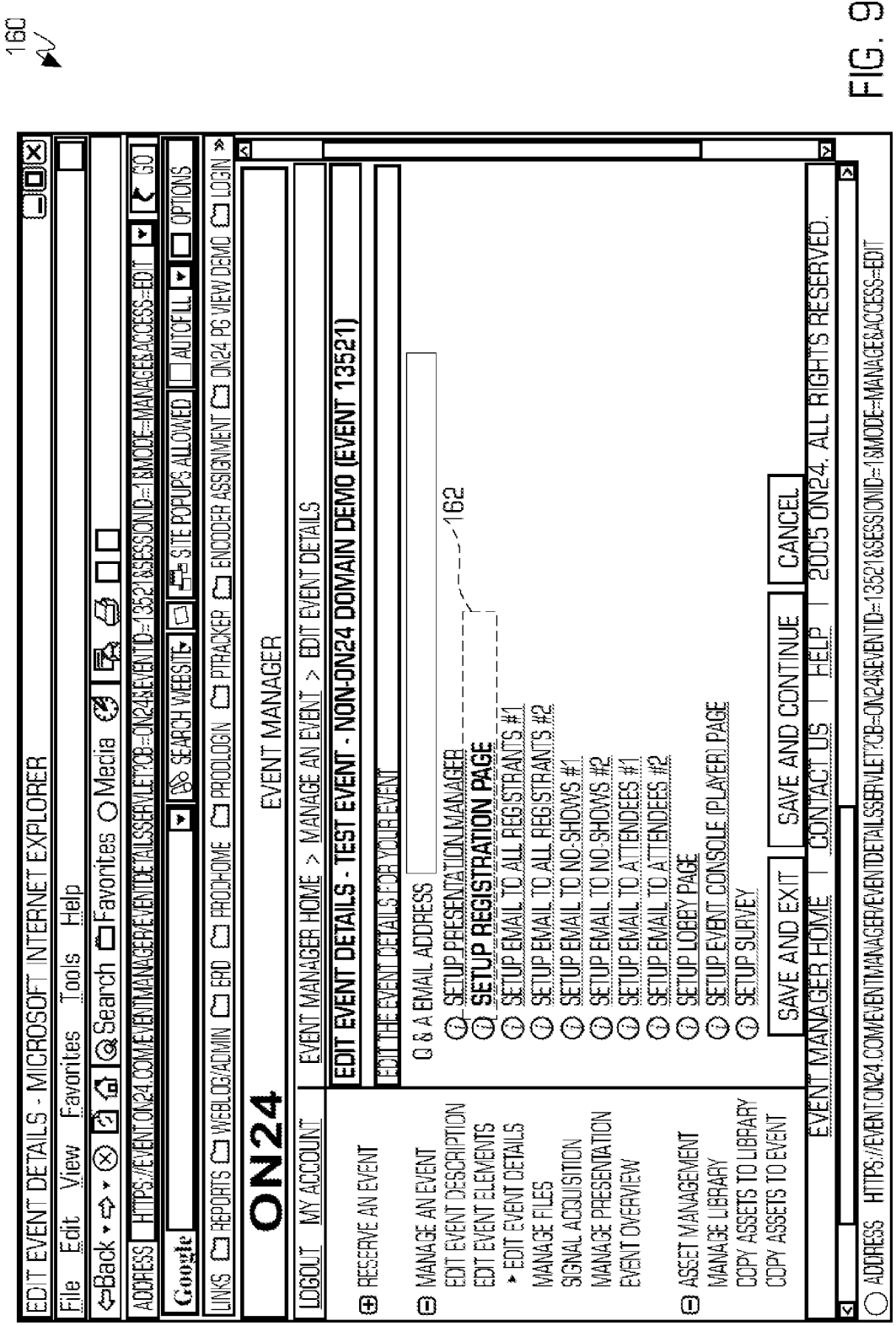
FIG. 9 illustrates an example of a launch page for a framed event.
Figure 11:
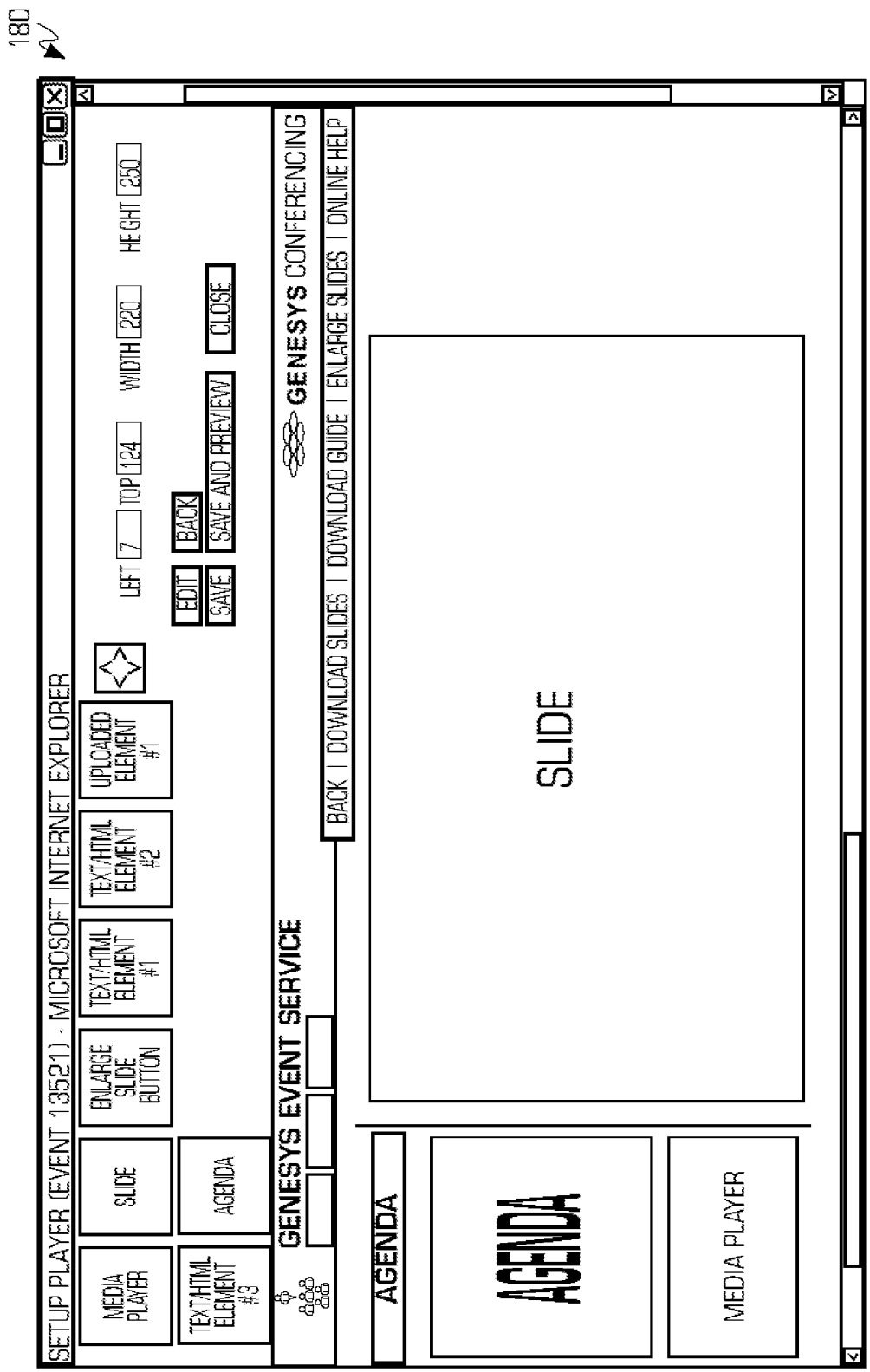
FIG. 11 illustrates an example of the user interface for laying out an event console of a framed event.

FIG. 9 illustrates an example of a launch page 160 for a framed event that permits a Presenter to set-up a framed event for the audience members. While the user interfaces for storing and manipulating this data can be numerous, an example of one instance of this functionality, that allows adding and graphically manipulating the content and layout of these display types via a web interface is provided in the following screenshots. The user interface permits the Presenter to set-up the various elements of the framed event as shown. In the example shown in FIG. 9, a Presenter has selected a link to set-up a registration page. FIG. 10 illustrates an example of a user interface 170 for setting up the registration page of a framed event. As shown in FIG. 10, the user interface 170 permits the Presenter to configure the registration page in this example. The user interface permits the user to configure the various display elements of the registration page. FIG. 11 illustrates an example of the user interface 180 for laying out an event console of a framed event wherein the Presenter can configure the event console of the framed event.

In order to be able to provide a framed event system that does not require an application download to the client computer, the system may include a cross-domain cookie usage mechanism and a communications mechanism that are now described. In particular, to coordinate the various actions that happen on an Event Console, the Event Console needs to read data from a central server as shown in FIG. 3. Thus, the Event Console has a redundant communications scheme with the central server to make sure that the communications are reliable and secure. In a preferred embodiment, the communications mechanism is implemented in software executed on the presentation site computer. Thus, if there is a media stream (internet based audio/video stream) that can contain embedded information, then that media stream is used to deliver the information to each client machine. If there is no media stream, then the browser uses the XMLHTTP protocol to request the information from a central server. If the XMLHTTP is not available, the system uses a downloadable applet to retrieve the information from the central server.

In more detail, the data transferred between the event console and the server may include two categories of data including commands and actions with data. The commands that may be communicated from the server to the event console may include, for example, a close console command to close the event console on the client site or a refresh console command to refresh the event console on the client site. The actions with data sent from the server to the event console may include, for example, a go to a next slide action (in which the URL of the next slide is provided to the event console as the data), a launch a poll/survey action (in which the URL of the poll/survey is provided to the event console as the data) or an open a web page action (in which the URL of the web page is provided to the event console as the data). These commands, actions and data elements (collectively referred to as "Presentation Information") are transferred in different mechanisms depending on the type of presentation and the way in which the user is accessing the presentation. For a live, streaming presentation (using Real Networks, Windows or a Flash media player) where there is a primary audio/video stream, the Presentation Information may be embedded into the datastream. For a live, non-streaming presentation (such as a telephone conference with an online set of slides), the Presentation Information is communicated to each event console using the XMLHTTP protocol or a Java applet to read data from the server via an intermediate text file. For an on-demand presentation, the Presentation Information is needed prior to the presentation and thus is retrieved at the time that the event console is launched.

Figure 12:
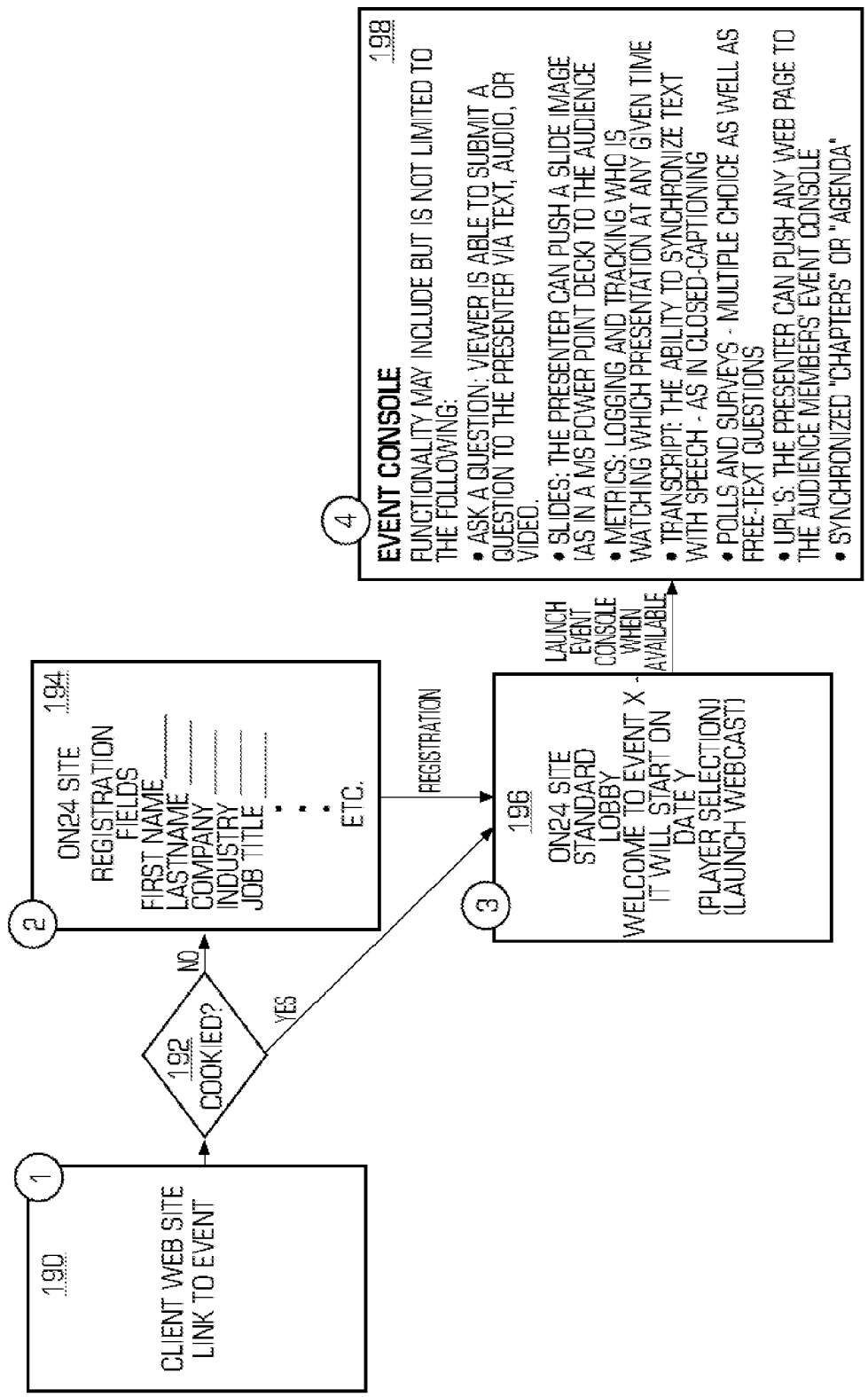
FIG. 12 is a diagram illustrating an example of the use of cross-domain cookies in accordance with the invention.

FIG. 12 is a diagram illustrating an example of the use of cross-domain cookies in accordance with the invention. In particular, browser security does not allow a web page served from one domain to read cookies written by a web page from another domain. However, the framed event system embeds an Event Console being served from one web site while the client web site that contains the data for the framed event displayed in the Event Console is in another domain so it is necessary to overcome this limitation. The solution is a general-purpose cookie parser that is deployed on the client site. The cookie parser may read the local cookies, append them into the query string, and pass them along to the second (embedded page) domain. As shown in FIG. 12, a client web site 190 contains a link to the event. In step 192, the framed event system determines of the event is cookied. If the event is not cookied, the user is directed to a registration process 194 and then onto a lobby process 196 once the registration is complete. If the event is cookied, then user is sent directly to the lobby process 196. When the event is ready, the user is transferred to an event console 198 in which the framed event occurs. As shown, the framed event (in the event console) may include one or more of: 1) an "ask a question" that permits an audience member to submit a textual, audio or video question to the Presenter; 2) a slide wherein the Presenter may push a slide image to the audience member; 3) a metric that logs and tracks which audience members are watching the framed event at any given time; 4) a transcript that synchronizes the text with speech (similar to close captioning); 5) polls and surveys that present multiple choice questions as well as free-text questions; 6) URLs wherein the Presenter pushes any web page to the Audience Member over the Event Console; and 7) synchronized chapters or agendas.

Figure 13:
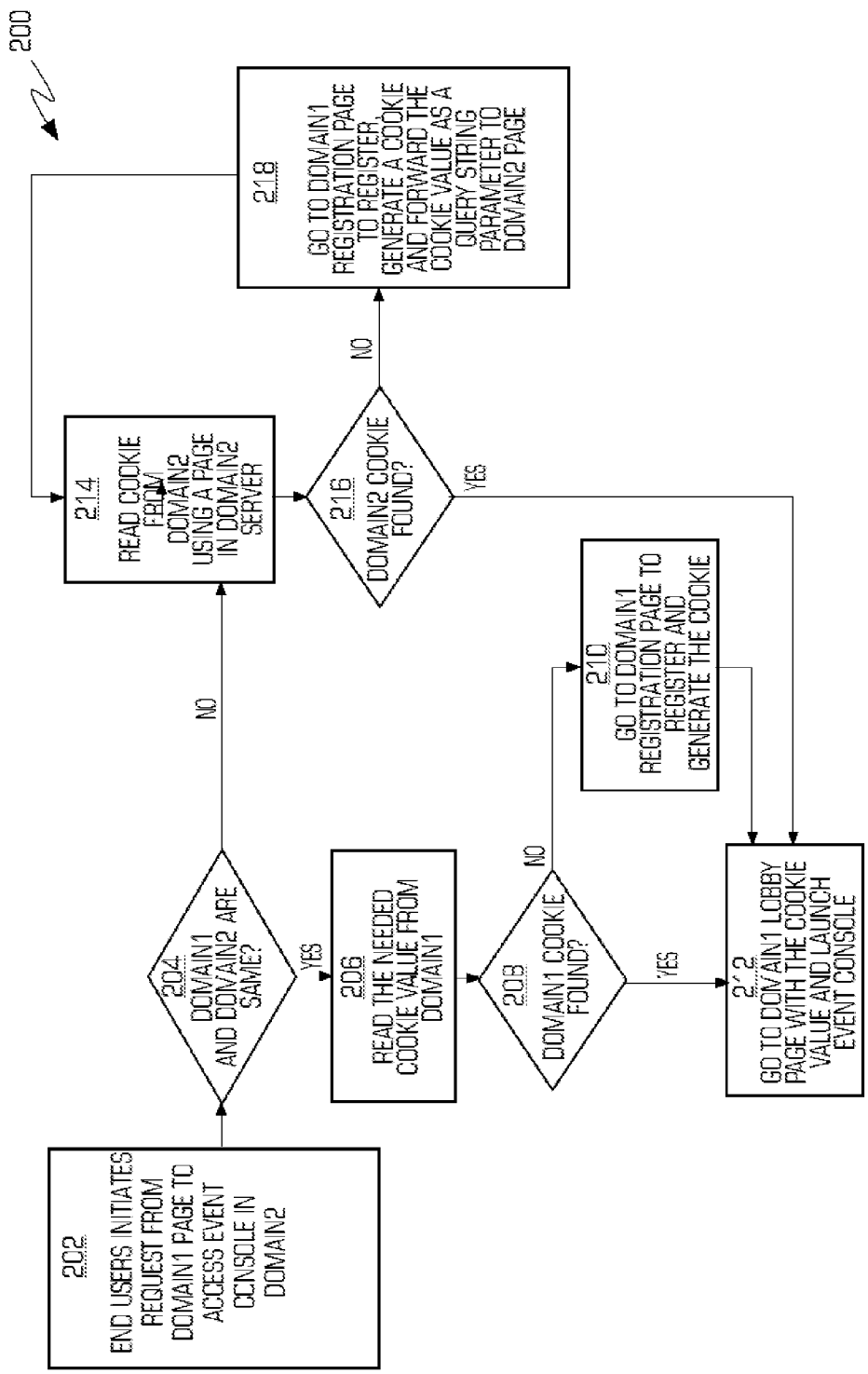
FIG. 13 illustrates a method for cross-domain cookie use in accordance with the invention.

FIG. 13 illustrates a method 200 for cross-domain cookie use in accordance with the invention. In a preferred embodiment, this method is implemented in a plurality of instructions that are executed by the client computer of the framed event system. For purposes of describing this method in accordance with the invention, a DOMAIN1 that may be an event console domain, such as *.on24.com, and DOMAIN2 that may be a client domain that hosts the event console, such as XXX.YYY.ZZZ, are used. In step 202, an end user initiates a request from a DOMAIN1 web page to access an event console in DOMAIN2. In step 204, the system determines if the two domains are the same by comparing the URLs of the two domains. If the two domains are the same, the system reads the needed cookie value from DOMAIN1 in step 206. In step 208, the system determines if the cookie is found in DOMAIN1. If the cookie is not found, then the system in step 210 directs the user to the DOMAIN1 registration page to register and generate the required cookie. Then in step 212, the user is directed to the DOMAIN1 lobby page with the cookie value and the event console is launched. Returning to step 208, if the DOMAIN1 cookie is found, then the method goes directly to step 212.

Returning to step 204, if the domains are not the same, then the system in step 214 reads the cookie from DOMAIN2 using a page in the DOMAIN2 server. In step 216, the system assesses whether the DOMAIN2 cookie is found. If the DOMAIN2 cookie is not found, then the user is directed to the DOMAIN1 registration page in step 218 to generate a cookie and forward the cookie value as a query string parameter to the DOMAIN 2 page and loops back to step 214. If the DOMAIN2 cookie is found, then step loops to step 212 as described above.

The client web site need to have installed some scripting code (html/javascript, for example) to read the cookies from the local domain and redirect to an ON24-hosted URL with the relevant cookie information appended to the querystring. The cookie data for the framed event system may be an eventide/userid pair such as for example "eventid13521=4103231" wherein 13521 is the event identifier and 4103231 is the user identifier. The cookie data is used to identify the user to the rest of the system and to track usage, assign rights and privileges, send out emails and certificates based on attendance, etc. The cookie data is an important part of the framed event system.

Figure 14:
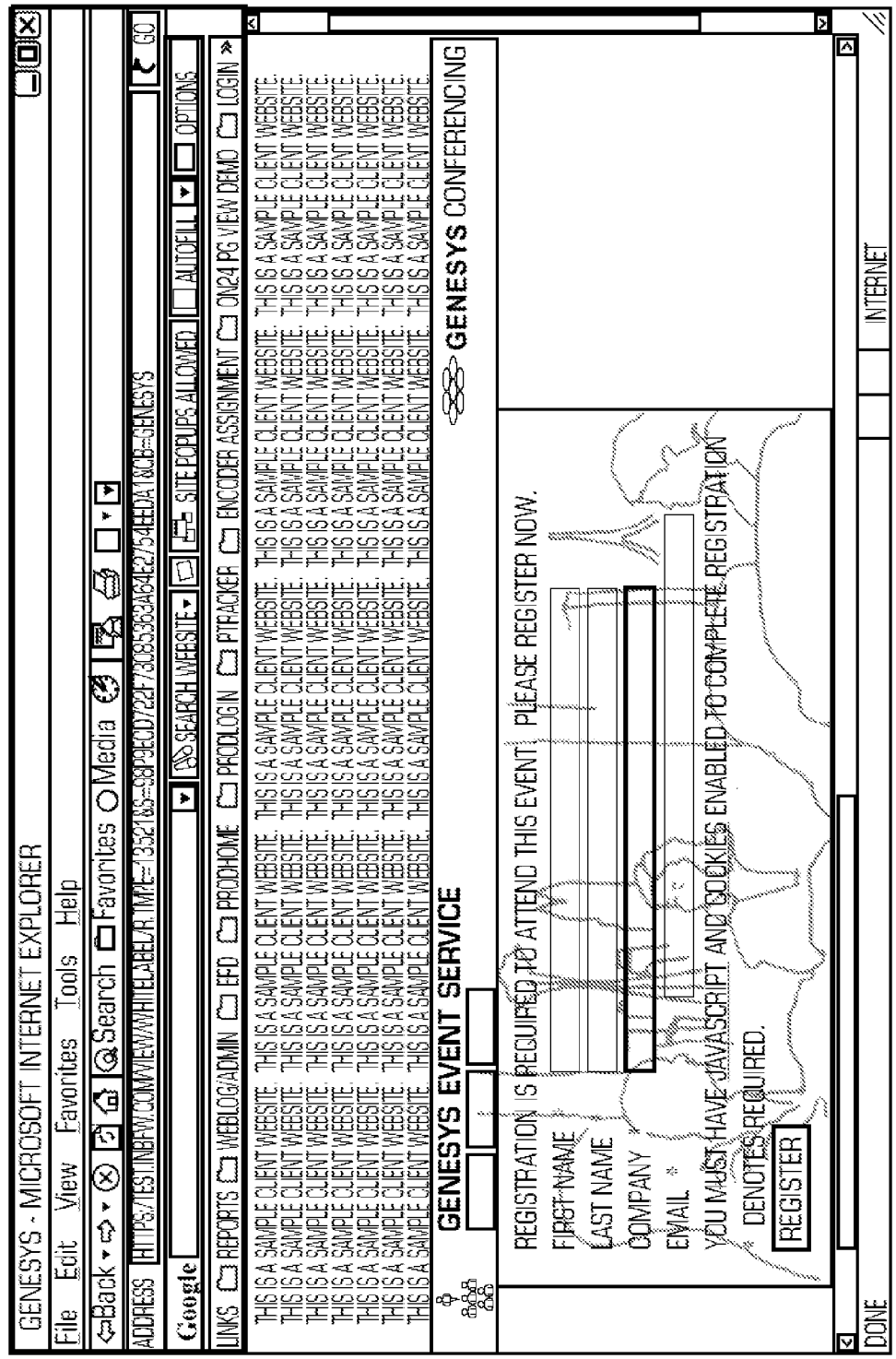
FIGS. 14-16 illustrate an example of a client web site that displays a framed event in accordance with the invention.
Figure 15:
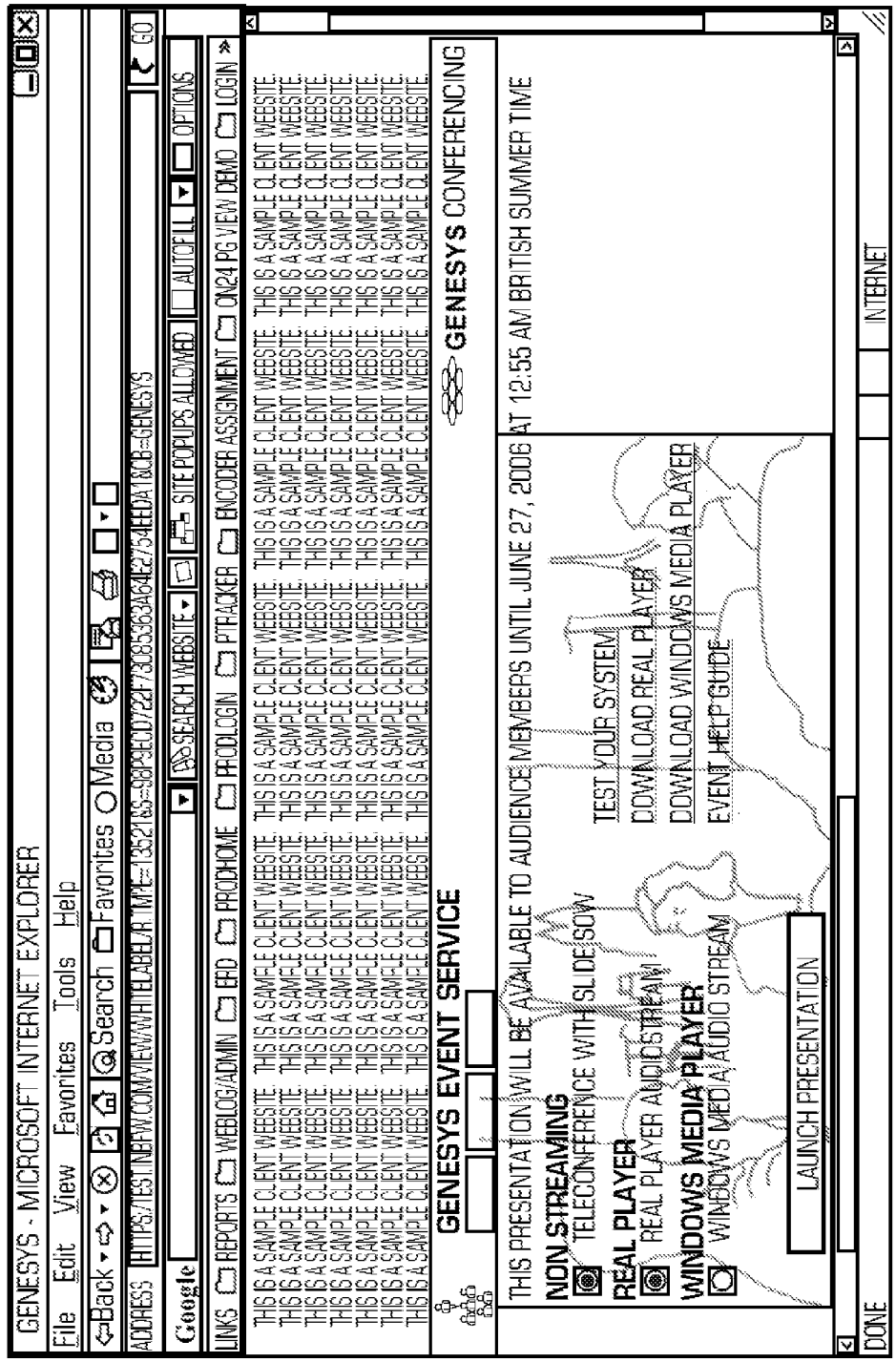
Figure 16:
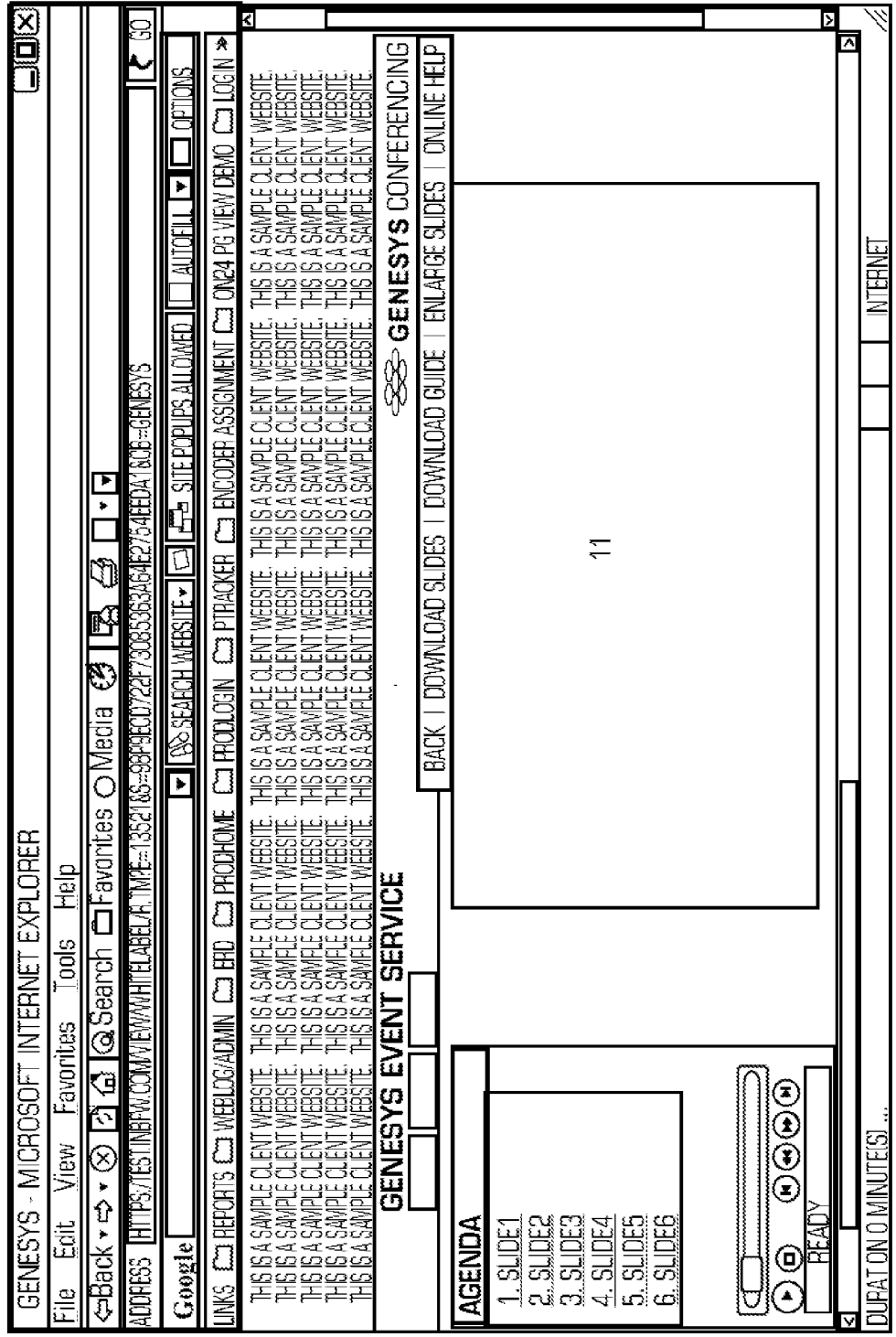

FIGS. 14-16 illustrate an example of a client web site that displays a framed event in accordance with the invention. As shown in FIG. 14, an example of a registration page 230 served to an audience member wherein the content for the framed event is located at a client site and the framed event elements are stored and served from the framed event system site. FIG. 15 illustrates an event configuration user interface 240 displayed to the audience member while FIG. 16 illustrates an example of an event console 250 displayed to the audience member. In accordance with the invention, the content of the framed event is stored on a client site while the framed event system, such as the registration page, lobby page and event console are stored on and served from the framed event system site using the cookie usage described above.

While the foregoing has been with reference to a particular embodiment of the invention, it will be appreciated by those skilled in the art that changes in this embodiment may be made without departing from the principles and spirit of the invention, the scope of which is defined by the appended claims.

The invention claimed is:

1. A system for providing a presentation over a computer network without an installation process using cross-domain cookies, the system comprising:
   an audience member computer comprising a standard operating system installation;
   a first domain comprising a first server; and
   a second domain comprising a second server;
   wherein the audience member computer is communicatively coupled to the first domain by a first network connection and the first domain and the second domain are communicatively coupled by a second network connection;
   the audience member computer sends a request to the first domain to receive the presentation from the second domain;
   the first domain generates a cookie via a registration process and forwards a cookie value to the second domain;
   the second domain parses the cookie value to enable the presentation from the second domain to be embedded in a communication from the first domain to the audience member computer for viewing at the audience member computer.

2. The system of claim 1 wherein the first domain further comprises a storage unit that data structures used to generate an interface for a framed event system and a display profile data structure that lists individual elements for registration, lobby, and player display types.

* * * * *